United States Patent
Hsieh et al.

(10) Patent No.: US 9,282,223 B1
(45) Date of Patent: Mar. 8, 2016

(54) CURVED DISPLAY APPARATUS AND GAMMA CORRECTION METHOD THEREOF

(71) Applicant: AU Optronics Corp., Hsin-Chu (TW)

(72) Inventors: Shang-Wei Hsieh, Hsin-Chu (TW); SuPer Liao, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 0 days.

(21) Appl. No.: 14/525,352

(22) Filed: Oct. 28, 2014

(30) Foreign Application Priority Data

Aug. 13, 2014 (TW) .............................. 103127809 A (51) Int. Cl.
| | |
|---|---|
| *G09G 5/10* | (2006.01) |
| *H04N 5/202* | (2006.01) |
| *G09G 3/36* | (2006.01) |
| *G02F 1/133* | (2006.01) |

(52) U.S. Cl.
CPC ............ *H04N 5/202* (2013.01); *G02F 1/13306* (2013.01); *G09G 3/36* (2013.01); *G09G 2320/0276* (2013.01); *G09G 2320/0626* (2013.01); *G09G 2320/0673* (2013.01); *G09G 2330/021* (2013.01); *G09G 2380/02* (2013.01)

(58) Field of Classification Search
CPC .................. G09G 2320/0276; G09G 2360/16; G09G 2320/0626
USPC ............................... 345/87–89, 441, 443, 690
See application file for complete search history.

(56) References Cited

U.S. PATENT DOCUMENTS

| | | | | |
|---|---|---|---|---|
| 2011/0134160 A1* | 6/2011 | Okishiro | ................. | G09G 5/02 345/690 |
| 2012/0249574 A1* | 10/2012 | Botzas | .................... | G09G 3/20 345/605 |
| 2012/0320096 A1* | 12/2012 | Small | .................. | G09G 3/2003 345/690 |
| 2013/0027439 A1* | 1/2013 | Kim | ...................... | G09G 3/003 345/690 |
| 2013/0321483 A1* | 12/2013 | You | ......................... | G09G 5/10 345/690 |
| 2014/0002509 A1* | 1/2014 | Kim | ...................... | G09G 3/003 345/690 |
| 2014/0192091 A1* | 7/2014 | Fan | ...................... | G09G 3/3607 345/690 |
| 2014/0225941 A1* | 8/2014 | Van der Vleuten | .... | G09G 5/006 345/690 |

* cited by examiner

*Primary Examiner* — Kimnhung Nguyen
(74) *Attorney, Agent, or Firm* — McClure, Qualey & Rodack, LLP (57) ABSTRACT

Disclosed herein are a curved display apparatus and a gamma correction method thereof. The curved display apparatus includes first, second, and third regions and a driving module. The first and third regions are located respectively along two opposite edges of the curved display apparatus, while the second region is located between the first and third regions. A control signal instructs the curved display apparatus to display by a grayscale value. The driving module is configured to receive the control signal and thereby generate first, second, and third voltage commands for the three regions respectively, in order to drive the three regions. According to the disclosed gamma correction method, the absolute voltage values indicated by the first and third voltage commands is less than that by the second voltage command when the grayscale value is not greater than a threshold value.

12 Claims, 6 Drawing Sheets

CURVED DISPLAY APPARATUS AND GAMMA CORRECTION METHOD THEREOF

CROSS-REFERENCE TO RELATED APPLICATIONS

This non-provisional application claims priority under 35 U.S.C. §119(a) on Patent Application No. 103127809 filed in Taiwan, R.O.C on Aug. 13, 2014, the entire contents of which are hereby incorporated by reference.

BACKGROUND OF THE INVENTION

1. Technical Field of the Invention

The present invention relates to a curved display, particularly to a curved display apparatus and a gamma correction method thereof.

2. Description of the Related Art

Figure 8:
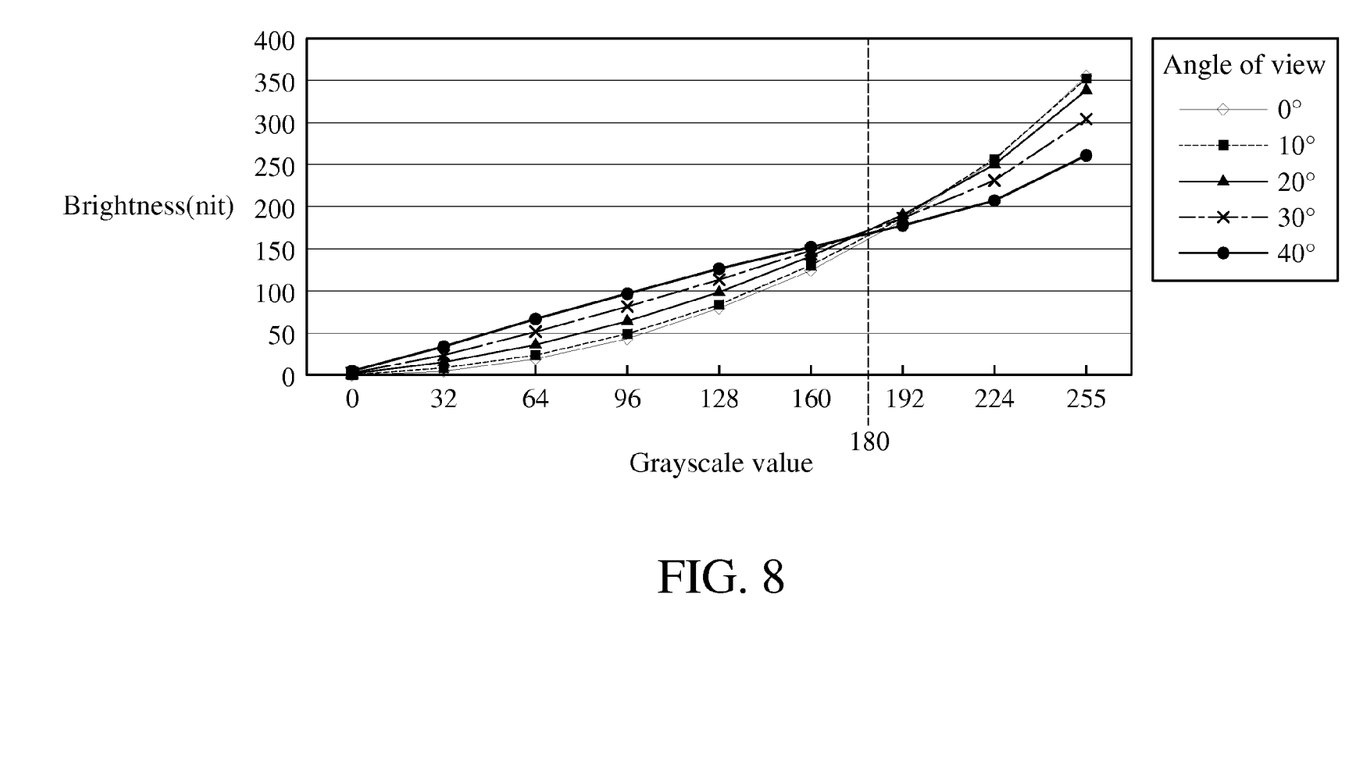
FIG. 8 is a diagram of the relationship between the display brightness and the grayscale value in different views of the curved display apparatus in the prior art.

With the popularity of the liquid crystal display device, various products manufactured by different technology are proposed, and the curved display apparatus is becoming noticed by the public in the market. In theory, when the curved display apparatus is given a consistent control signal in the whole surface, the same hue should be observed in each region of the curved surface, but in reality, the observed hue is not actually the same. Taking the convex surface display device for example, due to the characteristics of the liquid crystal display, if the observation is along a certain normal, most of the light emitted from the regions close to the observation point on the curved surface or the regions of almost 0° angle of view is directly received by the observer, and theoretically the display brightness of the said regions is brighter than the those with farther distance or larger angle of view (the definition of the angle of view corresponding to a certain point on the curved surface is the angle between the normal of that point and the said observation direction). Still, in practice, when the control signal instructs certain colors, partial color shift appears in the curved display apparatus, so that the regions with almost 0° angle of view are darker than those with larger angle of view instead. As shown in FIG. 8, when the grayscale values of white balance decreasing from 255 to 0 instructed by the control signal are given, the decreasing rate of the display brightness is higher if the angle of view is closer to 0° from 40°, and the brightness of each region of the curved surface with the grayscale value under 180 is in reverse.

SUMMARY OF THE INVENTION

According the problem, the purpose of the present invention is to disclose a curved display apparatus of regional driving and a gamma correction method for the apparatus.

The disclosed curved display apparatus includes a first region, a second region, a third region, and a driving module. The first region is located along one edge of the curved display apparatus, and the third region is located along another edge of the curved display apparatus, and the second region is located between the first region and the third region. A control signal instructs the curved display apparatus to display by a grayscale value. The driving module is for receiving and generating a first voltage command, a second voltage command, and a third voltage command for the first region, the second region, and the third region respectively according to the control signal to drive the first region, the second region, and the third region. When the grayscale value is not greater than a threshold value, the absolute voltage value indicated by the first voltage command and the third voltage command is less than the absolute voltage value indicated by the second voltage command.

The disclosed gamma correction method is for a curved display apparatus including a first region, a second region, and a third region. The first region is located along one edge of the curved display apparatus, and the third region is located along another edge of the curved display apparatus, and the second region is located between the first region and the third region. A control signal instructs the curved display apparatus to display by a grayscale value. After receiving the control signal, the gamma correction method includes generating a first voltage command, a second voltage command, and a third voltage command for the first region, the second region, and the third region respectively according to the control signal to drive the first region, the second region, and the third region. When the grayscale value is not greater than a threshold value, the absolute voltage value indicated by the first voltage command and the third voltage command is less than the absolute voltage value indicated by the second voltage command.

The contents of the present invention set forth and the embodiments hereinafter are for demonstrating and illustrating the spirit and principles of the present invention, and for providing further explanation of the claims.

BRIEF DESCRIPTION OF THE DRAWINGS

The present invention will become more fully understood from the detailed description given hereinbelow and the accompanying drawings, which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
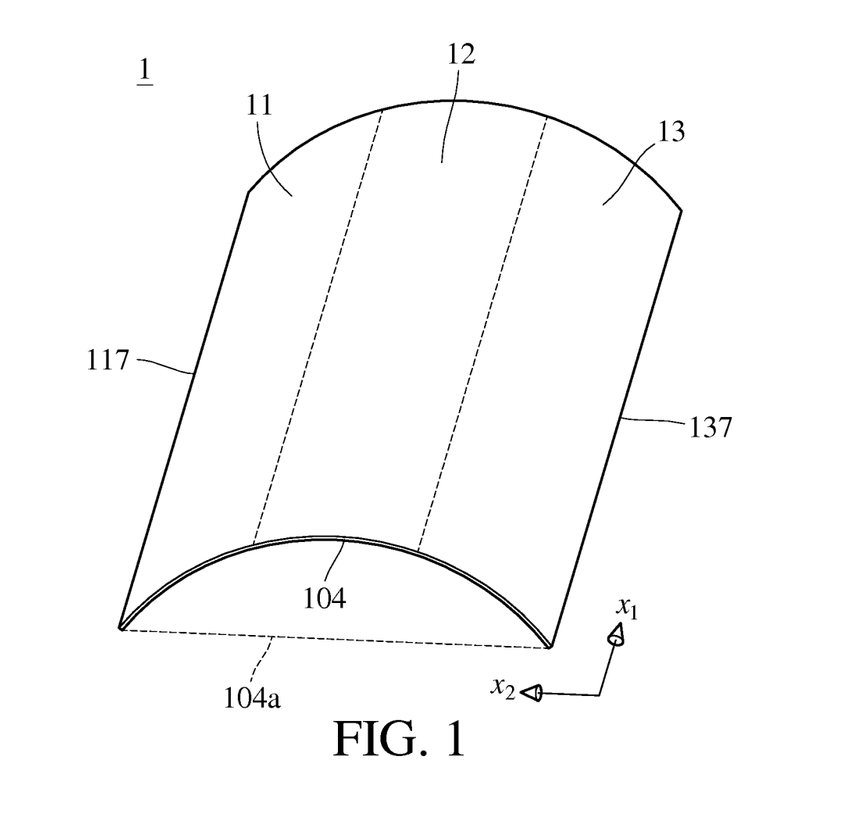
FIG. 1 is a curved display apparatus according to an embodiment of the present invention.

Please refer to FIG. 1. FIG. 1 is a curved display apparatus according to an embodiment of the present invention. As shown in FIG. 1, the curved display apparatus 1 is a convex surface, including a first region 11, a second region 12, a third region 13, and a driving module (not illustrated in the figure). Specifically, the two straight edges 117 and 137 of the curved display apparatus 1 parallel to the axis x1 are opposite to each other and respectively connected with the two opposite lateral parts. The first region 11 is located in one of the lateral parts, and the third region 13 is located in another lateral part, and the second region 12 is located between the first region 11 and the third region 13. 104a is projected along the axis x2 from an arc 104 of the curved display apparatus 1, and the positive curvature of the curved display apparatus 1 appears along the axis x2. In FIG. 1, the second region 12 further connects with the first region 11 and the third region 13, but in another embodiment, the second region 12 does not necessarily connect with the first region 11 or the third region 13 directly. In FIG. 1, the axis x1 is parallel to the boundaries of the three regions 11, 12, and 13, but in another embodiment, the boundaries of the each region 11, 12, and 13 can have multiple types, such as a Bézier curve curves to the straight edges 117 and 137. Generally the boundaries are not parallel to the axis x2.

Figure 2:
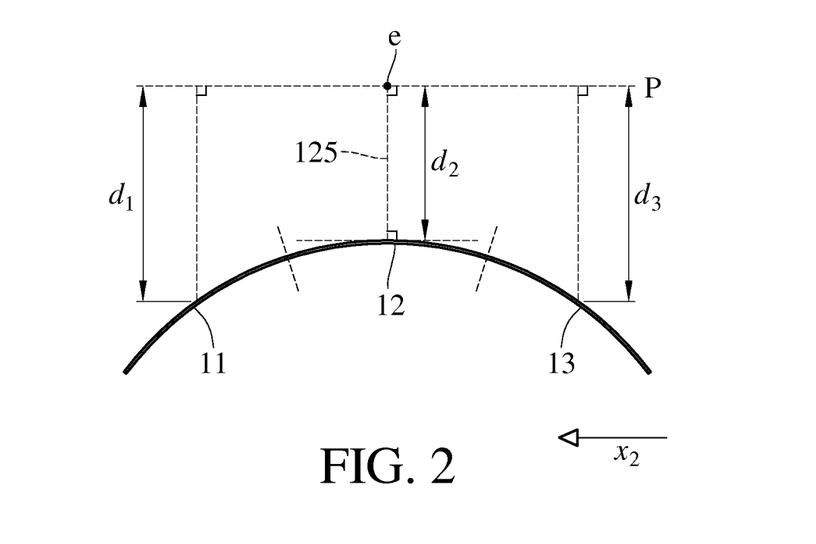
FIG. 2 is a cross-sectional diagram of the curved display apparatus in FIG. 1.

Please refer to FIG. 2. FIG. 2 is a cross-sectional diagram of the curved display apparatus 1 along the said axis x2, and illustrates the relative locations of the first region 11, the second region 12, and the third region 13 along the arc (such as arc 104). Generally, the second region 12 is the part that the observer directly faces comparing to other regions in the curved display apparatus 1, and it also means that the second region 12 is located in the relative center of the curved display apparatus 1. Specifically, the plane P that the observer or the observation point e located in is parallel to a section plane of the second region 12, and the normal 125 perpendicular to the section plane is perpendicular to the observation plane P, and the distance of the normal 125 between the section plane and the observation plane P is equal to the distance d2 between the observation point e and the second region 12. For example, the curved display apparatus 1 is a convex surface. The first region 11 and the third region 13 are located in two sides of the normal 125, namely, the part that observers need to observe in a greater angle of view. Therefore, the distance between any point and the observation plane P (such as d1 or d3) is greater than d2, or at least greater than the minimum distance between the second region 12 and the observation plane P.

In other embodiment, the said two opposite edges 117 and 137 can also be arcs. The previous descriptions are generally adapted for the region 11, 12, and 13, and the gamma correction method described below.

Figure 3:
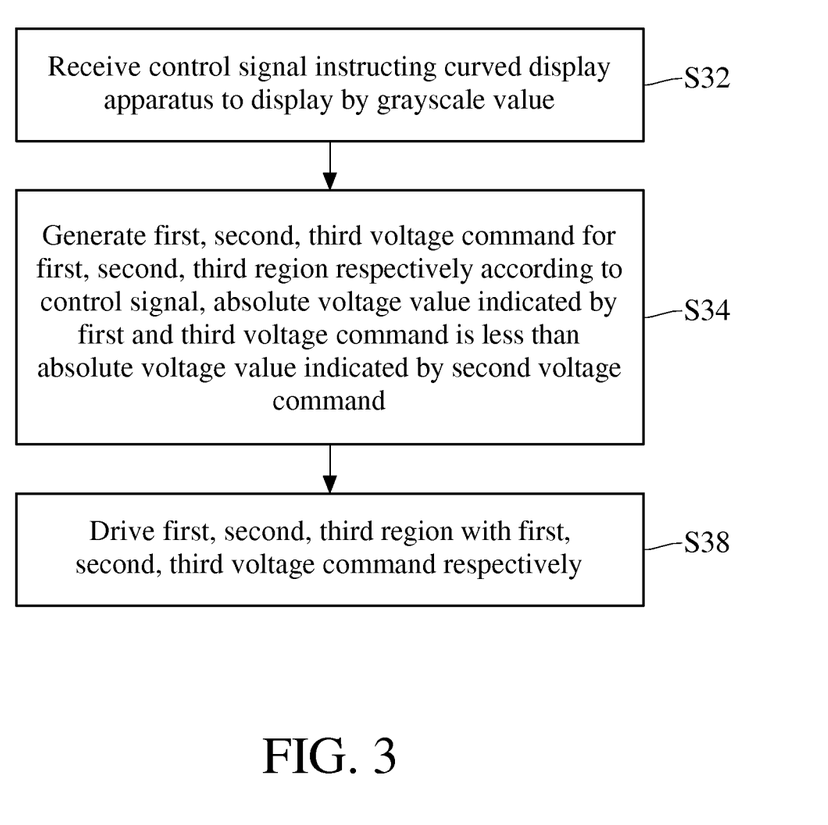
FIG. 3 is a flowchart of the gamma correction method according to an embodiment of the present invention.

Please refer to FIG. 3 for the actuation of the curved display apparatus 1. FIG. 3 is a flowchart of the gamma correction method according to an embodiment of the present invention. In the step S32, the said driving module receives the control signal. The control signal can be from a control circuit of the curved display apparatus 1 or any coupled computer, and for instructing at least one pixel of the curved display apparatus 1 to display a certain color. In other words, the control signal instructs the pixel of the curved display apparatus 1 to display by a grayscale value, and the grayscale value is defined in a certain dimension of the color space, such as the simple grayscale of the white balance, one of the 8-bit RGB space (0~255), or Y/Y' brightness axis of the YUV model. According to the control signal, in the step S34, the driving module respectively generates the voltage command for the three regions 11, 12, 13, and other regions possibly existed in the curved display apparatus 1, namely, the first, second, and the third voltage command. In the step S38, the three regions 11, 12, and 13 are driven by the first, second, and the third voltage command respectively. Generally, the higher absolute voltage value indicated by the voltage command is, the brighter the driven region becomes. When the curved display apparatus 1 is driven by electric currents, the voltage command can also indirectly indicate the magnitude of the electric currents.

According to the situation of brightness reversal in the center of the curved surface and the lateral parts from practical observation, the present invention actively adjusts the voltage relative value indicated by the first, second, and the third voltage command, so that the brightness of the first region 11 and the third region 13 is darker compared to the prior art which drives all the regions with the same voltage command as the second region 12. In other words, the absolute voltage value indicated by the first and the third voltage command is less than the absolute voltage value indicated by the second voltage command. In an embodiment, the difference of the absolute voltage values between the first region 11/third region 13 and the second region 12 needs to be large enough to compensate the brightness loss of the second region 12, so that the display brightness of the three regions 11, 12, 13 is the same.

According to another embodiment of the present invention, when the size of the first region 11 and is different from the size of the third region 13, the absolute voltage value indicated by the first voltage command is different from the absolute voltage value indicated by the third voltage command.

According to a further embodiment of the present invention, when the first region 11 and the third region 13 in the curved display apparatus 1 are not symmetric, for example, the second region 12 is not in the middle of the curved surface, the absolute voltage value indicated by the first voltage command is different from the absolute voltage value indicated by the third voltage command.

The said active adjustment, for example, is at least executed when the grayscale value instructed by the control signal is not greater than a certain threshold value. In practice, the driving module can reduce the voltage of the first region 11 and the third region 13, and increase the voltage of the second region 12, or execute both. When the grayscale value exceeds the threshold value, generally, the curved display apparatus 1 performs normally and the gamma correction is not necessary to execute. In other words, the first, second, and third voltage command indicate the same absolute voltage value according to a single control signal. However, in an embodiment, the optimized curved display apparatus 1 can make the absolute value indicated by the first and the third voltage command be less than the value indicated by the second voltage command even when the grayscale value exceeds the threshold value, in order to fulfill the observer's expectation that the color of the second region 11 should be brighter than the first region 11 and the third region 13.

When the gamma correction of the present invention is applied on all the grayscale values, in practice, table look-up translation can be adapted for corresponding the absolute voltage value to the first, second, and third voltage command respectively without determining whether the grayscale value is greater than the threshold value. For example, the driving module can be coupled with a storage unit, and the storage unit keeps the relationships between the grayscale value and the absolute voltage value (or brightness) for the three regions 11, 12, and 13 respectively. The driving module consults the storage unit when generating the voltage command or the driving module can use a hardware electric circuit or a software/firmware to dynamically compute the respective absolute voltage value for the three regions 11, 12, 13. For example, assuming that the driving module mainly adjusts the voltage of the first region 11, after generating the second voltage command according to the control signal, the absolute voltage value indicated by the first voltage command is the value indicated by the second voltage command multiplying a certain correction coefficient between 0 and 1, and the coefficient can have different definitions according to the variation of the grayscale value, as long as the display brightness of the first region 11 is strictly increasing when the grayscale value is greater and greater, and is less than the display brightness of the second region 12.

Figure 4:
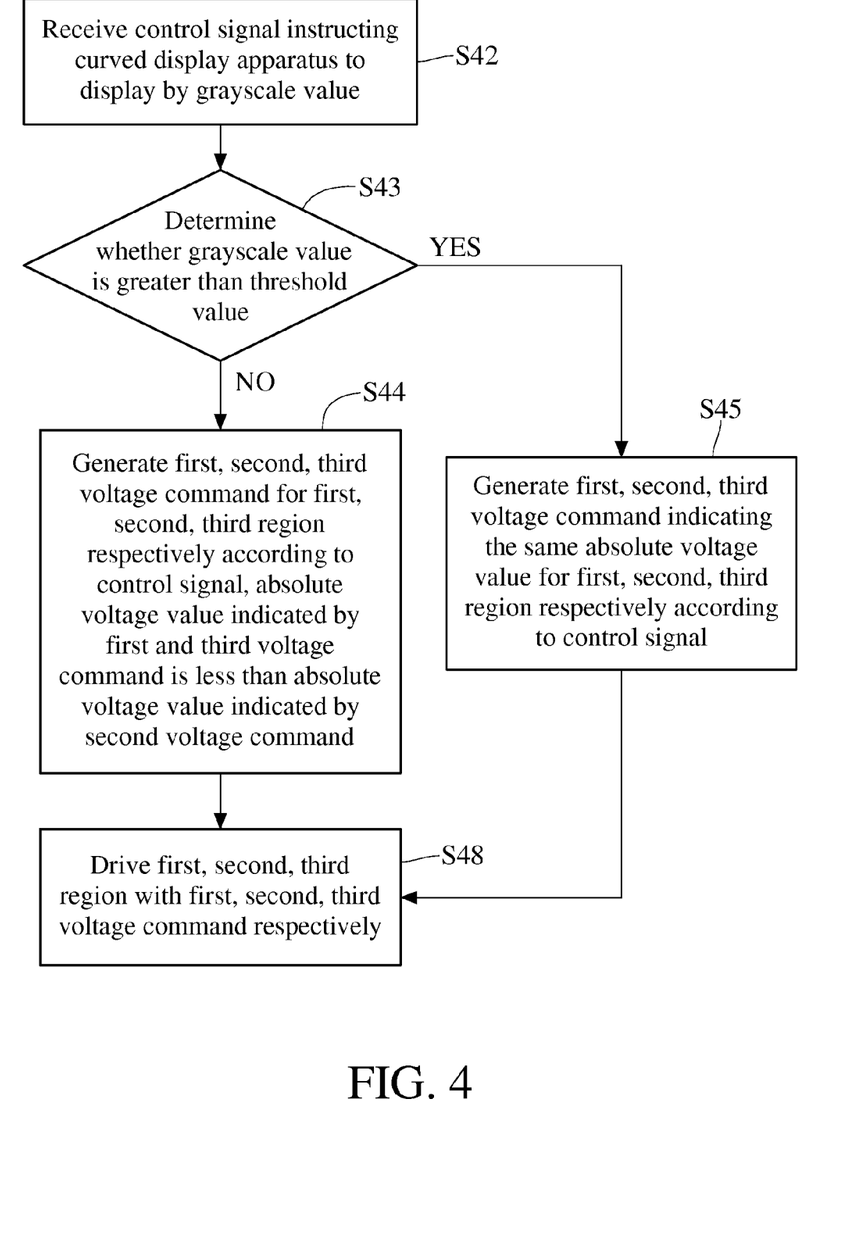
FIG. 4 is a flowchart of the gamma correction method according to another embodiment of the present invention.

Please refer to FIG. 4 with FIG. 3. FIG. 4 is a flowchart of the gamma correction method according to another embodiment of the present invention. The step S42 is similar to the step S32, however, in the present embodiment, the driving module determines whether the grayscale value is greater than the threshold value in the step S43. The driving module respectively generates different voltage command for each region 11, 12, 13 only when the grayscale value is not greater than the threshold value (the step S44), so that the absolute voltage values indicated by the first and the third voltage command is less than the value indicated by the second voltage command. In the step S44, for example, the step can be implemented with table look-up translation or dynamic computation. In the present embodiment, when the grayscale value is greater than the threshold value, the driving module gives the voltage command indicating the same absolute value for the three regions 11, 12, 13. In another embodiment, the driving module adopts different gamma curve to the two situations of the grayscale value above/under the threshold value. According to the previous example, assuming that the driving module mainly adjusts the voltage of the first region 11, in the step S43, the grayscale value variation curve of the display brightness or the absolute voltage value of the first region 11 is not continuous or undifferentiable at the threshold value. The step S48 is similar to the step S38, and is not further described here for clearness.

Figure 5:
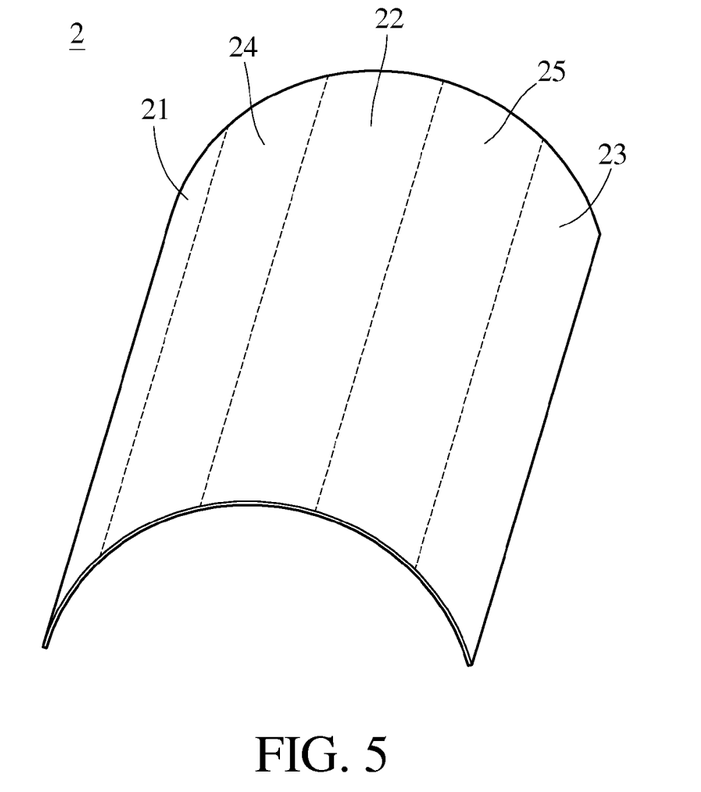
FIG. 5 is a curved display apparatus according to another embodiment of the present invention.
Figure 6:
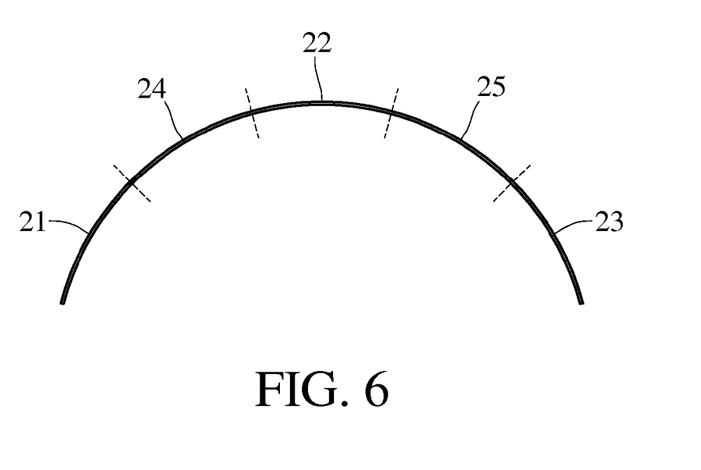
FIG. 6 is a cross-sectional diagram of the curved display apparatus in FIG. 5.

Please refer to FIG. 5 with FIG. 1. FIG. 5 is a curved display apparatus according to another embodiment of the present invention. As shown in FIG. 5, the curved display apparatus 2 is still a convex surface including the first region 21, the second region 22, the third region 23, the fourth region 24, the fifth region 25, and the driving module (not illustrated in the figure). The location of the first region 21 on the curved display apparatus 2 is similar to the location of the first region 11 on the curved display apparatus 1, namely, the first region 21 is located on a side of the curved display apparatus 2, and the third region 23 is in the similar way. As the said descriptions, the second region 12 is located between the first region 11 and the third region 13, but is not necessarily connected with the first region 11 or the third region 13. In FIG. 5, there is still the fourth region 24 between the second region 22 and the first region 21, and there is still the fifth region 25 between the second region 22 and the third region 23. Please refer to FIG. 6 for the relative location of each region 21 to 25 in the arc (such as an arc of the curved display apparatus 2). FIG. 6 is a cross-sectional diagram of the curved display apparatus 2 similar to FIG. 2. Generally, the curved display apparatus with greater curvature needs more regions, and the driving module respectively drives each region for reducing the color shifts and maintaining the display uniformity, and the curvature of the curved display apparatus 2 is greater than the curvature of the curved display apparatus 1. In an embodiment, in the lateral part located from the second region of the relative center to the curved surface, a new region is divided from the surface when a certain degrees of the angle of view is increased (such as 10°).

Please refer to FIG. 3 again. When the shown gamma correction method is applied on the curved display apparatus 2, in the step S34, the driving module of the curved display apparatus 2 further respectively generates a fourth and fifth voltage command for the fourth region 24 and the fifth region 25 according to the control signal. In the step S38, the fourth region 24 and the fifth region 25 are further driven by the fourth and fifth voltage command respectively. At least when the grayscale value instructed by the control signal and accordingly displayed by the curved display apparatus 2 is not greater than the threshold value, the absolute voltage value indicated by the fourth voltage command is between that values indicated by the first and the second voltage command, and the absolute voltage value indicated by the fifth voltage command is between that values indicated by the second and the third voltage command, and the absolute voltage values or brightness values of the fourth region 24 and the fifth region 25 are not necessarily the same, exactly as the third region 23 and the first region 21 can be asymmetric. Specifically, the absolute value indicated by the second voltage command is greater than the value indicated by the fourth voltage command, and the value indicated by the fourth voltage command is greater than the value indicated by the first voltage command, and the inequality related to the fifth voltage command is in the similar way.

As the descriptions mentioned above, the driving module of the curved display apparatus 2 can separately and selectively execute gamma correction to each region 21 to 25. The so called "selectively" includes two aspects: first, not any or different gamma correction can be executed on the part of the regions, for example, when the driving module focuses on the second region 22, it only needs to reduce the absolute voltage value of the fourth region 24 and the fifth region 25 and more significantly reduce the absolute voltage value of the first region 21 and the third region 23; second, when the grayscale value is greater than the threshold value (the determination criterion is similar to the step S43 in FIG. 4), the gamma correction can be not executed, or different gamma curves are applied on the grayscale values above/under the threshold value.

Figure 7:
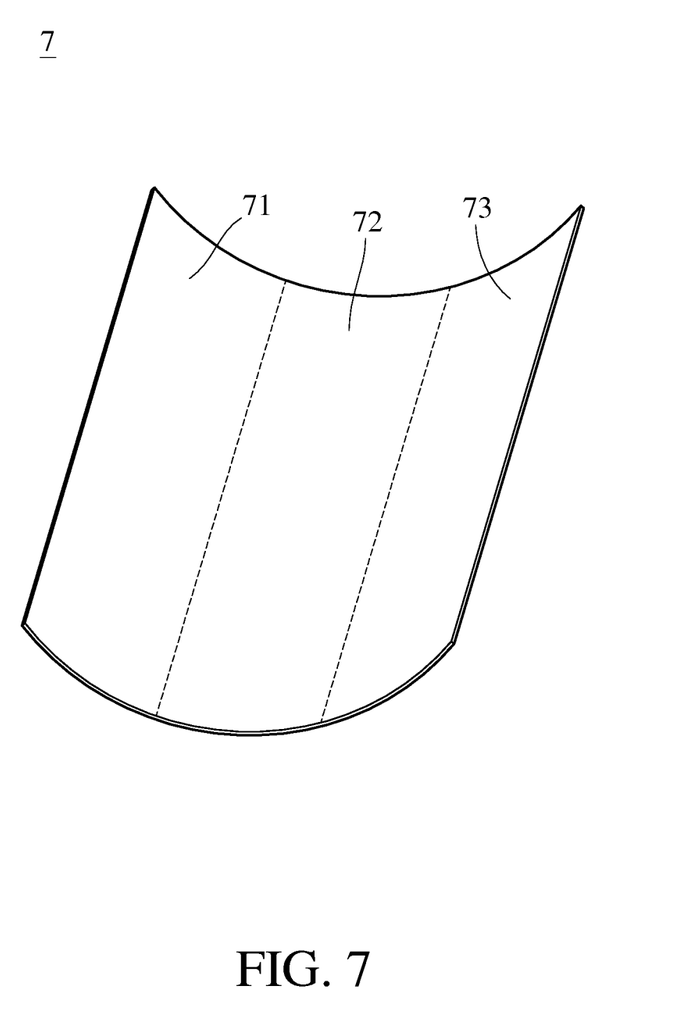
FIG. 7 is a curved display apparatus according to a further embodiment of the present invention.

Please be noted that the spirit of the present invention is to execute gamma correction actively, so that the display brightness of each region of the curved surface can fulfill any surface and any expectation. Please refer to FIG. 7. FIG. 7 is a curved display apparatus according to a further embodiment of the present invention. As shown in FIG. 7, the curved display apparatus 7 is a concave including the first region 71, the second region 72, the third region 73, and the driving module (not illustrated in the figure). For a control signal, no matter what the threshold value or the observation direction is, when the expectation is that the first region 71 is darker than the second region 72 without corrections, the first region 71 is relatively brighter or as bright as the second region 72, so the driving module can separately generate the first and the second voltage command, wherein the absolute voltage value indicated by the first voltage command is less than the value indicated by the second voltage command. For another control signal, when the expectation is that the third region 73 is much brighter than the second region 72, but the real situation does not actually match with the expectation, so the driving module separately generates the second and third voltage command to indicate a relatively low absolute voltage value for the said region.

In summary, to each grayscale value indicated by a certain control signal, the present invention executes the gamma correction and drives the curved display apparatus region by region, so that the brightness of the curved display apparatus is getting brighter from the two laterals of the curved surface to the relative center to fulfill the expectation of the observer. The gamma correction can be implemented by table look-up translation or dynamic computation. Each region has a corresponding one or multiple gamma curves, and in some embodiments, the determination of whether the grayscale value is greater than the threshold value is used with the previous method. In an embodiment, the number of the regions and the curvature has positive correlation.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention. It is intended, therefore, that the specification and examples be considered as exemplary only, with a true scope and spirit of the invention being indicated by the following claims and their full scope of equivalents.

What is claimed is:

1. A gamma correction method for a curved display apparatus, the curved display apparatus comprising a first region, a second region, and a third region, the first region located along one edge of the curved display apparatus, the third region located along another edge of the curved display apparatus, the second region located between the first region and the third region, the gamma correction method comprising:
   receiving a control signal, the control signal instructing the curved display apparatus to display by a grayscale value; and
   generating a first voltage command, a second voltage command, and a third voltage command for the first region, the second region, and the third region respectively according to the control signal to drive the first region, the second region, and the third region;
   wherein when the grayscale value is not greater than a threshold value, the absolute voltage value indicated by the first voltage command and the third voltage command is less than the absolute voltage value indicated by the second voltage command.

2. The gamma correction method of claim 1, wherein the least distance between a observation plane perpendicular to a normal of the second region and the second region is less than the distance between the observation plane and the first region or the third region.

3. The gamma correction method of claim 1, wherein when the grayscale value is greater than the threshold value, the absolute voltage value indicated by the first voltage command and the third voltage command is not greater than the absolute voltage value indicated by the second voltage command.

4. The gamma correction method of claim 3, further comprising:
   determining whether the grayscale value is greater than the threshold value;
   wherein when the grayscale value is greater than the threshold value, the absolute voltage value indicated by the first voltage command and the third voltage command is equal to the absolute voltage value indicated by the second voltage command.

5. The gamma correction method of claim 1, wherein the absolute voltage value indicated by the first voltage command is different from the absolute voltage value indicated by the third voltage command.

6. The gamma correction method of claim 1, wherein the curved display apparatus further comprises a fourth region and a fifth region, the fourth region located between the first region and the second region, the fifth region located between the second region and the third region, the gamma correction method further comprising:
   generating a fourth voltage command and a fifth voltage command for the fourth region and the fifth region respectively according to the control signal to drive the fourth region and the fifth region;
   wherein when the grayscale value is not greater than the threshold value, the absolute voltage value indicated by the fourth voltage command and the fifth voltage command is less than the absolute voltage value indicated by the second voltage command, and is greater than the absolute voltage values indicated by the first voltage command and the third voltage command.

7. A curved display apparatus, comprising:
   a first region located along one edge of the curved display apparatus;
   a second region;
   a third region located along another edge of the curved display apparatus, the second region located between the first region and the third region; and
   a driving module for receiving and generating a first voltage command, a second voltage command, and a third voltage command for the first region, the second region, and the third region respectively according to the control signal to drive the first region, the second region, and the third region;
   wherein the control signal instructs the curved display apparatus to display by a grayscale value, and when the grayscale value is not greater than a threshold value, the absolute voltage value indicated by the first voltage command and the third voltage command is less than the absolute voltage value indicated by the second voltage command.

8. The curved display apparatus of claim 7, wherein the least distance between a observation plane perpendicular to a normal of the second region and the second region is less than the distance between the observation plane and the first region or the third region.

9. The curved display apparatus of claim 7, wherein when the grayscale value is greater than the threshold value, the absolute voltage value indicated by the first voltage command and the third voltage command is not greater than the absolute voltage value indicated by the second voltage command.

10. The curved display apparatus of claim 9, wherein the driving module is further for determining whether the grayscale value is greater than the threshold value, and when the grayscale value is greater than the threshold value, the absolute voltage value indicated by the first voltage command and the third voltage command is equal to the absolute voltage value indicated by the second voltage command.

11. The curved display apparatus of claim 7, wherein the absolute voltage value indicated by the first voltage command is different from the absolute voltage value indicated by the third voltage command.

12. The curved display apparatus of claim 7, wherein the curved display apparatus further comprises a fourth region and a fifth region, and the fourth region is located between the first region and the second region, and the fifth region is located between the second region and the third region, and the driving module is further for generating a fourth voltage command and a fifth voltage command for the fourth region and the fifth region respectively according to the control signal to drive the fourth region and the fifth region, and when the grayscale value is not greater than the threshold value, the absolute voltage value indicated by the fourth voltage command and the fifth voltage command is less than the absolute voltage value indicated by the second voltage command, and is greater than the absolute voltage value indicated by the first voltage command and the third voltage command.

* * * * *